(12) United States Patent
Haubner et al.

(10) Patent No.: US 7,094,933 B2
(45) Date of Patent: Aug. 22, 2006

(54) METHOD FOR PRODUCING TETRAHYDROFURANE COPOLYMERS

(75) Inventors: Martin Haubner, Eppelheim (DE); Rolf Pinkos, Bad Dürkheim (DE); Alexander Weck, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 125 days.

(21) Appl. No.: 10/524,555

(22) PCT Filed: Jul. 30, 2003

(86) PCT No.: PCT/EP03/08406

§ 371 (c)(1),
(2), (4) Date: Feb. 14, 2005

(87) PCT Pub. No.: WO2004/020499

PCT Pub. Date: Mar. 11, 2004

(65) Prior Publication Data

US 2006/0167321 A1    Jul. 27, 2006

(30) Foreign Application Priority Data

Aug. 30, 2002  (DE) ............................... 102 39 947

(51) Int. Cl.
*C07C 43/13* (2006.01)
*C07C 43/11* (2006.01)
(52) U.S. Cl. ........................ 568/620; 568/619; 568/618
(58) Field of Classification Search ................ 568/620, 568/619, 618
See application file for complete search history.

(56) References Cited

FOREIGN PATENT DOCUMENTS

| DE | 100 32 264 A1 | 1/2002 |
|---|---|---|
| DE | 100 32 265 A1 | 1/2002 |
| EP | 0 126 471 A2 | 11/1984 |

*Primary Examiner*—Elvis O. Price
(74) *Attorney, Agent, or Firm*—Connolly, Bove, Lodge and Hutz, LLP

(57) ABSTRACT

The present invention provides a process for one-stage preparation of polyoxyalkylene glycols by copolymerizing tetrahydrofuran and alpha,omega-diols in the presence of a heteropolyacid and of a hydrocarbon, which comprises distilling water in a mixture with this hydrocarbon out of the copolymerization.

20 Claims, No Drawings

METHOD FOR PRODUCING TETRAHYDROFURANE COPOLYMERS

This application is a National Stage of PCT/EP03/08406 filed Jul. 30, 2003, which claims priority from DE 102 39 947.6 filed Aug. 30, 2002.

The present invention relates to a novel process for preparing polyoxyalkylene glycols (polyalkylene ether glycols) by copolymerizing tetrahydrofuran and alpha,omega-diols in the presence of heteropolyacids and hydrocarbons, in which water is removed directly from the copolymerization as a mixture of the hydrocarbons.

Polyoxyalkylene glycols are important starting materials for the preparation of elastic fibers, elastic construction materials and coatings. They are prepared by polymerizing tetrahydrofuran (referred to hereinbelow as "THF") or by copolymerizing THF with oxiranes such as ethylene oxide or propylene oxide or with alpha,omega-diols in the presence of cationic catalysts. EP-A 126 471, for example, discloses the use of heteropolyacids as catalysts. This process allows polyalkylene ether glycols to be accessible in one stage, while other processes initially provide the esters of the polyoxyalkylene glycols, which still have to be hydrolyzed to the polyoxyalkylene glycols before their use in the field of polymers.

The copolymerization of THF with alpha,omega-diols releases water of reaction. In addition, the commercially obtainable heteropolyacids comprise from 10 to 40 mol of water of crystallization per mole of heteropolyacid. Since water on the one hand adversely affects the catalyst activity and on the other hand functions as a chain terminating reagent (known as "telogen"), it is necessary to remove the water of reaction and also the water of crystallization from the copolymerization.

JP-A 10-87811 discloses a batchwise process for preparing THF copolymers with alpha,omega-diols in the presence of a heteropolyacid, in which water is removed. A portion of the copolymerization solution is continuously withdrawn from the polymerization reactor and subjected to a process for water removal. For this purpose, a phase separation is initially effected in a decanter and the catalyst-containing lower phase is recycled into the polymerization reactor. The upper phase obtained is passed into a distillation unit where the low boilers are removed. The bottom effluent, mainly copolymers, is recycled into the copolymerization. The low boiler mixture is dried using suitable adsorbents and likewise recycled into the polymerization.

This batchwise polymerization stage is very laborious, but also inconvenient and costly, since the achievement of a steady state requires three recyclings (catalyst recycling, prepolymer recycling from the evaporation and solvent recycling). This requires a large amount of apparatus.

It is an object of the present invention to make the copolymerization of THF with alpha,omega-diols in the presence of heteropolyacids simpler and more economic. In particular, a means should be found of continuously preparing polyoxyalkylene glycols having a narrow molecular weight distribution. The novel process should provide polyoxyalkylene glycols having incorporation rates of the diol comonomer of from 14 to 60% by weight, based on the copolymer. The polyoxyalkylene glycols should additionally have low color numbers and a low residual contamination of heteropolyacid catalyst or its subsequent products.

A process has now been found, surprisingly, for one-stage preparation of polyoxyalkylene glycols by copolymerizing tetrahydrofuran (THF) and alpha,omega-diols in the presence of a heteropolyacid and of a hydrocarbon, which comprises distilling water in a mixture with this hydrocarbon out of the copolymerization. In this application, a mixture is either a customary nonazeotropic mixture or a hydrocarbon-water azeotrope.

The hydrocarbons used should be suitable for azeotrope formation with water. The hydrocarbon used may, for example, be an aliphatic or cycloaliphatic hydrocarbon having from 4 to 12 carbon atoms or an aromatic hydrocarbon having from 6 to 10 carbon atoms or a mixture thereof. Specific examples include pentane, hexane, heptane, octane, decane, cyclopentane, cyclohexane, benzene, toluene, xylene or naphthalene, and preference is given to pentane, cyclopentane and octane, particular preference to pentane.

The hydrocarbons are added to the fresh feed of the copolymerization in an amount of from $1 \times 10^{-4}$% by weight (corresponding to 1 ppm) to 30% by weight, based on the fresh feed of alpha,omega-diol and THF, preferably from 1 ppm to 16% by weight, more preferably from 1 to 10% by weight. However, it is also possible to introduce the hydrocarbon into the top of the distillation column for removing the mixture of hydrocarbon and water. The total amount of water which is discharged from the copolymerization can be used to control the particular molar mass. In general, 1 mol of heteropolyacid binds from 10 to 40 molecules of water by coordinative bonding. The heteropolyacids used as catalysts should should contain from about 1 to 10 molecules of water per molecule of heteropolyacid. Water is additionally released by the copolymerization with the alpha,omega-diols used as comonomer. The higher the water content of the copolymerization solution, the lower the molecular weight of the copolymer obtained.

In this application, the term "average molecular weight" or "average molar mass" refers to the number-average molecular weight $M_n$ of the polymers contained in the polymer formed.

Examples of useful comonomers include alpha,omega-diols, for example, $C_2$- to $C_{10}$-alkanediols such as ethylene glycol, propylene glycol, 1,3-propanediol, 1,3-butanediol, 2-methylbutanediol, 1,4-butanediol, 1,5-pentanediol, 1,6-hexanediol, neopentyl glycol, 3-methyl-1,5-pentanediol, 1,8-octanediol, 1,10-decanediol, diethylene glycol, triethylene glycol, low molecular weight THF copolymers containing the alpha,omega-diols mentioned here and having an average molecular weight of from 200 to 600 dalton or mixtures thereof. Preferred comonomers are low molecular weight comonomers having an average molecular weight of from 200 to 600 dalton and neopentyl glycol, and particular preference is given to neopentyl glycol.

It is also possible to use mixtures of tetrahydrofuran, 1,4-butanediol and 2-methylbutanediol, and the proportion of 2-methylbutanediol in such mixtures may be between 100 ppm and 60% by weight, based on the mixture.

According to the invention, from 1 to 60% by weight of the alpha,omega-diol are used in the copolymerization, based on the tetrahydrofuran used, preferably from 2 to 40% by weight, more preferably from 3 to 20% by weight.

The THF is copolymerized with alpha,omega-diols in the presence 35 of heteropolyacids as catalysts in a manner known per se, for example as described in EP-A 126 471.

Heteropolyacids which are used according to the invention are inorganic polyacids which, in contrast to isopolyacids, have at least two different central atoms. Heteropolyacids are formed from in each case weak polybasic oxoacids of a metal such as chromium, molybdenum, vanadium or tungsten, and also of a nonmetal such as arsenic, iodine, phosphorus, selenium, silicon, boron or tellurium, as partially mixed anhydrides. Examples include dodecatungstenphosphoric acid $H_3(PW_{12}O_{40})$ or decamolybdophosphoric acid $H_3(PMo_{12}O_{40})$. As a second central atom, the heteropolyacids may also contain actinides or lanthanides (see Z. Chemie 17 (1977), pages 353 to 357, and 19 (1979), 308).

The heteropolyacids may be generally described by the formula $H_{8-n}(Y''M_{19}O_{40})$ where n=valency of the element Y (e.g. boron, silicon, zinc) (see also Heteropoly-und Isopolyoxometalates, Berlin; Springer 1983). Particularly suitable catalysts for the process according to the invention include phosphotungstic acid, phosphomolybdic acid, silicomolybdic acid and silicotungstic acid.

The heteropolyacids used as catalysts may be used either dried (from 1 to 10 mol of water/mole of heteropolyacid) or undried (from 10 to 40 mol of water/heteropolyacid) in the copolymerization.

The water present in the copolymerization reactor, some of which is water of crystallization from the heteropolyacid and some of which is water formed during the reaction, is removed as a mixture of the hydrocarbon added with the fresh feed with water at a temperature of from 40 to 120° C., more preferably from 50 to 70° C., and a pressure of from 150 mbar to 2 bar, preferably 230 mbar, with the aid of a customary distillation apparatus, directly from the copolymerization reactor, i.e. from the copolymerization reactor without intermediate workup steps such as phase separations.

The resulting vapors are preferably precipitated in a surface condenser; however, quench and jet condensers are also possible. The resulting condensate is fed to solvent workup to remove the water. It is particularly advantageous to partially recycle the condensate into the reactor, i.e. remove the heat of reaction by means of evaporative cooling. To achieve very high water contents in the condensate to be removed, another multistage countercurrent rectification column charged with the recycled condensate as reflux may be inserted between reactor and condenser.

In a further embodiment, THF is distilled off at the same time as the mixture of the hydrocarbon used in the copolymerization with water, and, depending on the hydrocarbon, may form a ternary azeotrope.

The hydrocarbon distilled off in a mixture with water or the mixtures of water and hydrocarbon with tetrahydrofuran may be dried over a suitable solid adsorbent, for example over molecular sieves, and be recycled back into the copolymerization. A phase separation into an aqueous phase and the hydrocarbon is also conceivable. The aqueous phase contains up to 5% by weight of THF, preferably <1% by weight. It also contains the particular hydrocarbon in concentrations of <1% by weight. THF and the hydrocarbon may be recovered by distillative workup of the aqueous phase and recycled. However, the aqueous phase may also be discarded.

The copolymer solution remaining after removing the hydrocarbon/water mixture is preferably transferred to a phase separator. The addition of further amounts of hydrocarbon separates the heteropolyacid from the product phase. This process known per se, for example from EP-A 181 621, leads to the subsequent precipitation of the heteropolyacid from the organic phase. The hydrocarbon used is preferably the hydrocarbon already used in the copolymerization.

In the case of the continuous method, the catalyst phase remains in the reaction apparatus and, in accordance with the catalyst losses which result from the discharge of small amounts of catalyst with the product-containing upper phase, is continuously supplemented by feeding new and/or optionally by recycling the discharged catalyst.

The upper phase contains the majority of the copolymer and THF and also small residual amounts of heteropolyacid or its subsequent products. Their content generally does not exceed 0.03% by weight, based on the copolymerization effluent. Nevertheless, it was recognized that these residual amounts of the catalyst and its subsequent products have to be removed, since they adversely affect the properties of the copolymers in their further processing.

The THF may be distillatively removed from the copolymer before or after the removal of the catalyst fractions and/or subsequent products of the catalyst by filtration, for example ultrafiltration, adsorption on solid adsorbents and/or with the aid of ion exchangers, although preference is given to filtration and adsorption on solid adsorbents. The filtration is preferably effected without preceding removal of the THF by distillation.

The adsorption on the solid adsorbents mentioned may also be combined with a neutralization of the polymerization effluent by bases. Examples of useful bases include the hydroxides and carbonates of the alkali metals and alkaline earth metals.

The adsorption is preferably effected on activated carbon and/or metal oxides and/or ion exchangers at temperatures of from 10 to 75° C., preferably from 20° C. to 70° C. Particular preference is given to effecting the removal in workup stage a) on ion exchangers and/or activated carbon. Preferred metal oxides are sodium hydroxide, aluminum oxide, silicon dioxide, titanium dioxide, zirconium dioxide, lanthanum oxide and/or calcium oxide.

Suitable activated carbon may be obtained, for example, from Merck, Darmstadt, or in the form of the trade product CPG UF 8×30 activated carbon from Chemviron Carbon.

Examples of suitable ion exchangers include anion exchangers such as the trade product Lewatit MP 600®, which may be obtained from Bayer A G, Leverkusen, mixed ion exchangers, for example the trade product Serdolit®, which may be obtained from Serva, Heidelberg, or molecular sieves having pore sizes of from 3 to 10 Å.

The removal according to the invention of the catalyst fractions and/or subsequent products of the catalyst by adsorption on solid adsorbents is preferably used in a fixed bed, generally at a loading of from 0.2 to 5 kg/l*h, in particular from 0.4 to 4 kg/l*h (kg of polymerization effluent per 1 of adsorbent per hour).

The process according to the invention may be performed either continuously or batchwise, or else in a semibatch method. A semibatch method or semicontinuous method refers to the initial charging of the heteropolyacid with from 20 to 50% by weight of the other reactants. The remainder of the reactants is then metered in in the course of the reaction time. For the continuous and batchwise method, the heteropolyacid is advantageously used in amounts of from 10 to 300 parts by weight, preferably from 50 to 150 parts by weight, based on 100 parts by weight of the monomers used (THF and alpha,omega-diols). It is also possible to add larger amounts of heteropolyacids to the reaction mixture.

The heteropolyacid may be added to the reaction in solid form, whereupon it is gradually solvated to form the liquid catalyst phase by contacting with the further reactants. Another procedure is to slurry the solid heteropolyacid with the alpha,omega-diol to be used and/or the THF and pass the resulting catalyst solution as a liquid catalyst phase into the reactor. Either the catalyst phase or the monomeric starting material may be initially charged in the reactor. However, it is also possible to introduce both components at the same time into the reactor.

In the case of the continuous method, fresh monomer is customarily metered into the reactor under the control of a level regulator. Advantageously, fresh monomer is fed at the rate that product and unconverted monomer are discharged from the reaction apparatus. In this way, the residence time, and therefore the polymerization time, may be controlled, thus providing another means for influencing and controlling the average molecular weight of the polymer being formed. Depending on the amount of catalyst and the reaction temperature, the copolymerization is generally carried out in the case of the batchwise method over a period of from 0.5 to 70 hours, preferably from 5 to 50 hours and more preferably from 10 to 40 hours. In the case of the continuous process, typical residence times are from 1 to 50 hours and preferably from 10 to 40 hours. At the beginning of a continuous reaction, the reaction system described requires a certain time until a steady-state equilibrium has been attained, and during this time it may be advantageous to keep the reactor outlet closed, i.e. to discharge no product solution from the reaction apparatus.

The copolymerization is customarily carried out at temperatures of from 20 to 100° C., preferably from 30 to 80° C. Advantageously, operation is effected under atmospheric pressure, although the reaction under pressure, especially under the autogenous pressure of the reaction system, may prove equally advantageous.

In the batchwise, semibatchwise and continuous methods, the reactors should be equipped with efficient mixing apparatus, for example stirrers.

Useful reactors are all liquid reactors which are known to those skilled in the art and have inert and/or external free liquid surface area for the necessary evaporation of the aqueous vapors, and in which sufficiently high shear forces for suspending the catalyst phase in the homogeneous monomer/polymer phase are achieved in the liquid (stirred tanks, circulation reactors, jet loops, pulsed internals). A particularly advantageous design is the embodiment as a jet loop, since this allows the necessary heating of the reactor to be integrated into the liquid circulation stream in a simple manner. The aqueous mixture of the hydrocarbon is vaporized continuously or batchwise out of the reaction mixture and the water content of the reactor contents is adjusted in this manner to values which are advantageous from the point of view of the reaction.

The process according to the invention is advantageously carried out under an inert gas atmosphere, using any desired inert gases, such as nitrogen or argon. Before their use, the reactants are freed of any water and peroxides contained therein.

However, preference is given to employing the continuous method. The reaction may be performed in conventional reactors or reactor arrangements suitable for continuous processes, for example in tubular reactors which are equipped with internal fitments which ensure good mixing of the emulsion-like copolymerization mixture, or else in stirred tank batteries.

An emulsion-like copolymerization mixture has water contents of from 2 to 10 mol of water per mole of heteropolyacid.

The process according to the invention allows polyoxyalkylene glycols, in particular copolymers of THF and neopentyl glycol, to be obtained economically and in a good yield, selectively and with a narrow molecular weight distribution, and also in pure form with low color numbers. The copolymers have incorporation rates of the alpha,omega-diol comonomer of from 10 to 50% by weight, based on the copolymer, and average molecular weights $M_n$ of from 600 to 6000. The polyoxyalkylene glycols which can be prepared according to the invention find, for example, for preparing specific polyurethanes which are suitable as highly elastic composite materials. A polyurethane polymer which comprises the copolymers which can be prepared according to the invention has a high lengthening after break, a small change in tension on lengthening, a low hysteresis loss on elongation and contraction, and also a high elasticity even in extreme cold.

EXAMPLES

Determination of the Tungsten Content in the Polymerization Effluent (Cation Analysis by Atomic Absorption Spectroscopy AAS)

Approx. 1 g of the sample solution is subjected to a breakdown process, in which the sample is initially treated with concentrated sulfuric acid. After the mineral acids have fumed off, the tungsten remains in hydrochloric acid solution. The tungsten content in this solution is determined by mass spectrometry with inductively coupled plasma (ICP-MS).

Determination of Color Number

The polymers freed of solvent are analyzed untreated in a Dr. Lange LICO 200 liquid color measuring instrument. Helma 100-QS precision cuvettes (layer thickness 50 mm) are used.

Determination of OH Number

The hydroxyl number is that amount of potassium hydroxide in mg which is equivalent to the amount of acetic acid bound in the acetylation of 1 g of substance.

The hydroxyl number is determined by the esterification of the hydroxyl groups present with an excess of acetic anhydride. After the reaction, the excess acetic anhydride is hydrolyzed with 10 water and back-titrated as acetic acid using aqueous sodium hydroxide solution.

Determination of Copolymerization Ratio

The copolymerization ratio was determined by $^1$H NMR using a Bruker dpx 400 instrument; 400 MHz, log. Standard: tetramethylsilane (TMS), using $CDCl_3$ as the solvent.

Example 1

In a 20 l jacketed reactor equipped with a magnetic stirring apparatus, a mixture of 5060 g of THF and 440 g of neopentyl glycol was stirred to a homogeneous solution. 4125 g of a hydrated dodecaphosphotungstic acid ($H_3PO_4$.x $H_2O$ where x=4–7) were added with stirring. The temperature of the heating medium (oil) was set to 95° C. and the emulsion was stirred discontinuously for 5 h. Afterwards, 200 g/h of a mixture of neopentyl glycol/THF/n-pentane which consisted of eight parts of NPG, 3 parts of pentane and a remainder of THF were continuously introduced into the reaction vessel. The reaction temperature is maintained at 63–64° C. The THF/pentane/water mixture which evaporates off was condensed and fed to workup.

The continuously obtained reaction effluent of the polymerization reactor was admixed with 250 g of pentane in a workup vessel and a phase separation was carried out. The heavy, aqueous phase was recycled into the polymerization vessel. The upper phase was passed at 20° C. over activated carbon (Chemviron Carbon; CPG UF 8×30) which was arranged as a fixed bed in a 2.5 l vessel.

450 g/h of the reaction effluent treated with activated carbon and 210 g/h of the condensate evaporated off from the reaction (97% by weight of THF, 0.2% by weight of pentane, 1.9% by weight of water) were fed to plate 7 of a countercurrent rectification column having 30 theoretical plates and operated at 1.2 bar, and separated there into a vapor stream of 1210 g/h (98.3% by weight of pentane, 0.09% by weight of THF, 1.5% by weight of water) and a bottom stream of 553 g/h (70% by weight of THF, 7.3% by weight of neopentyl glycol, 22.5% by weight of copolymer, 0.1% by weight of pentane) with a reflux of 1105 g/h (0.1% by weight of THF, 1% by weight of water, 98.8% of pentane). The top stream was condensed and two liquid phases formed. The aqueous phase was partially discharged (57.3 g/h, pentane and only traces of THF present). The remaining aqueous phase and a portion of the organic phase were fed to the column as reflux. Pentane losses were compensated in a pentane recycle stream for reaction and phase separation. To adjust the water content in the reaction or phase separation, a portion of the aqueous phase was optionally introduced into the pentane recycle stream.

The THF was initially evaporated off from the bottom effluent of the column in one stage at 75° C. and 1.2 bar and recycled into the reaction, and then the NPG was likewise evaporated off in one stage at 15 mbar and 170° C. and recycled into the reaction.

A copolymer was obtained having an OH number of 58 mg of KOH/g, a color number of 10 APHA and a tungsten content of <1 ppm.

The incorporation rate of NPG was 18 parts by weight.

Example 2

Batchwise Process Operation

The reaction apparatus consists of a distillation apparatus which has a 50 cm distillation column, a condenser and reflux valves, and a heatable 10 l reactor.

In the reactor, 765 g of neopentyl glycol and 1875 g of THF are introduced and stirred to a homogeneous solution. 1500 g of hydrated dodecaphosphatungstic acid ($H_3PO_4*12 WO_3*.H_2O$ where x=4–7, Aldrich) were added with stirring. The temperature of the heating medium was set to 95° C. Once the temperature of the reaction solution had reached 70° C., the emulsion-like solution was maintained under reflux for 5 hours.

Afterwards, 50 ml of pentane were added via the top of the distillation column. The water released during the reaction was distilled off together with THF. In the column, a pentane/water mixture formed which had the azeotropic composition at the top of the column. The top stream was condensed. A biphasic mixture was formed, and the upper organic phase was recycled back into the column. The reaction time was 24 h. 122 g of water were distilled off.

After the reaction, the separated solution phase (2700 g) was withdrawn. 1300 g of catalyst phase remained afterwards. The solution phase was worked up in a similar manner to Example 1. The OH number of the copolymer was determined. The molecular weight of the polymer was 1929. The copolymerization ratio of neopentyl glycol was determined by means of $^1H$ NMR and was 34.5 mol %.

We claim:

1. A process for one-stage preparation of polyoxyalkylene glycols by copolymerizing tetrahydrofuran and alpha, omega-diols in the presence of a heteropolyacid and of a hydrocarbon, which comprises distilling water in a mixture with this hydrocarbon out of the copolymerization.

2. A process as claimed in claim 1, wherein an aliphatic or cycloaliphatic hydrocarbon having from 5 to 12 carbon atoms or an aromatic hydrocarbon having from 6 to 12 carbon atoms or a mixture thereof is used.

3. A process as claimed in claim 1, wherein the hydrocarbon used is pentane.

4. A process as claimed in claim 1, wherein tetrahydrofuran is distilled off at the same time.

5. A process as claimed in claim 1, wherein the mixture of hydrocarbon, water and optionally tetrahydrofuran are distilled at from 40 to 120° C. and a pressure of from 150 mbar to 2 bar.

6. A process as claimed in claim 1, wherein the hydrocarbon or the hydrocarbon/tetrahydrofuran mixture is recycled after drying.

7. A process as claimed in claim 1, which can be carried out continuously or batchwise.

8. A process as claimed in claim 1, wherein the alpha, omega-diol used is neopentyl glycol.

9. A process as claimed in claim 2, wherein the hydrocarbon used is pentane.

10. A process as claimed in claim 2, wherein tetrahydrofuran is distilled off at the same time.

11. A process as claimed in claim 3, wherein tetrahydrofuran is distilled off at the same time.

12. A process as claimed in claim 2, wherein the mixture of hydrocarbon, water and optionally tetrahydrofuran are distilled at from 40 to 120° C. and a pressure of from 150 mbar to 2 bar.

13. A process as claimed in claim 3, wherein the mixture of hydrocarbon, water and optionally tetrahydrofuran are distilled at from 40 to 120° C. and a pressure of from 150 mbar to 2 bar.

14. A process as claimed in claim 4, wherein the mixture of hydrocarbon, water and optionally tetrahydrofuran are distilled at from 40 to 120° C. and a pressure of from 150 mbar to 2 bar.

15. A process as claimed in claim 2, wherein the hydrocarbon or the hydrocarbon/tetrahydrofuran mixture is recycled after drying.

16. A process as claimed in claim 3, wherein the hydrocarbon or the hydrocarbon/tetrahydrofuran mixture is recycled after drying.

17. A process as claimed in claim 4, wherein the hydrocarbon or the hydrocarbon/tetrahydrofuran mixture is recycled after drying.

18. A process as claimed in claims 5, wherein the hydrocarbon or the hydrocarbon/tetrahydrofuran mixture is recycled after drying.

19. A process as claimed in claim 2, which can be carried out continuously or batchwise.

20. A process as claimed in claim 3, which can be carried out continuously or batchwise.

* * * * *